United States Patent [19]
Cookson

[11] Patent Number: 6,064,729
[45] Date of Patent: *May 16, 2000

[54] PERIPHERAL CONTROL IN AN INTELLIGENT NETWORK

[75] Inventor: Martin D Cookson, Cambridgeshire, United Kingdom

[73] Assignee: British Telecommunications Public Limited Company, London, United Kingdom

[*] Notice: This patent is subject to a terminal disclaimer.

[21] Appl. No.: 09/043,407

[22] PCT Filed: Mar. 21, 1997

[86] PCT No.: PCT/GB97/00802

§ 371 Date: Mar. 18, 1998

§ 102(e) Date: Mar. 18, 1998

[87] PCT Pub. No.: WO97/37498

PCT Pub. Date: Oct. 9, 1997

Related U.S. Application Data

[63] Continuation-in-part of application No. 08/684,260, Jul. 19, 1996, Pat. No. 5,889,848.

[30] Foreign Application Priority Data

Mar. 29, 1996 [EP] European Pat. Off. .............. 96302239

[51] Int. Cl.[7] .................................................. H04M 3/42
[52] U.S. Cl. ........................... 379/230; 379/207; 379/229
[58] Field of Search .................................... 379/230, 229, 379/201, 207, 219, 220; 370/465, 466; 455/414

[56] References Cited

U.S. PATENT DOCUMENTS

| | | | |
|---|---|---|---|
| 5,469,500 | 11/1995 | Satter et al. | 379/201 |
| 5,572,581 | 11/1996 | Sattar et al. | 379/201 |
| 5,583,920 | 12/1996 | Wheeler, Jr. | 379/207 |
| 5,664,102 | 9/1997 | Faynberg | 379/207 |
| 5,838,768 | 11/1998 | Sumar et al. | 379/207 |
| 5,889,848 | 3/1999 | Cookson | 379/230 |
| 5,970,385 | 10/1999 | Pykalisto | 379/92.02 |
| 5,978,672 | 11/1999 | Hartmaier et al. | 455/413 |

OTHER PUBLICATIONS

BT Technology Journal, vol. 13, No. 2, Apr. 1995, Ipswich GB, pp. 30–42, Bale, "Signalling in the intelligent network".

International Conference on Universal Personal Communications, Session 6.4, Sep. 27, 1994, San Diego, US, pp. 635–639, Chopra, "Exploring Intelligent Peripheral configurations".

Telecommunications (Interantional Ed.0, vol. 28, No. 6, Jun. 1994, US, pp. 29–34, Bic, "Voice peripherals in the intelligent network".

International Switching Symposium Session B6.2, vol. 2, Oct. 25, 1992, Yokohama, JP, pp. 117–121, Jain, "Intelligent Peripheral: Signaling and protocols".

Annual Review of Communications, vol. 46, 1992–1993, Chicago, US, pp. 644–649, Ryan et al, "Intelligent Peripherals—The required component".

*Primary Examiner*—Krista Zele
*Assistant Examiner*—Benny Q. Tieu
*Attorney, Agent, or Firm*—Nixon & Vanderhye P.C.

[57] ABSTRACT

An intelligent peripheral (IP) (3) in a telecommunications network is operated under the control of a service control point (SCP) (5). Control messages conforming to a standard control protocol, which may be INAP—the Intelligent Network Application Protocol, are passed from the SCP to the IP which then executes a predetermined function. Some of the control messages include a field identifying the messages as relating to an additional function not provided for in the standard protocol. In response to such a message the IP executes the relevant additional function instead of one of the standard functions.

13 Claims, 10 Drawing Sheets

Microfiche Appendix Included
(1 Microfiche, 18 Pages)

PERIPHERAL CONTROL IN AN INTELLIGENT NETWORK

Related Application

This is a continuation-in-part of my commonly assigned U.S. application Ser. No. 08/684,260 filed Jul. 19, 1996 now U.S. Pat. No. 5,889,848.

REFERENCE TO MICROFICHE APPENDIX

A microfiche appendix (comprising 1 sheet of 18 frames) is of record and has been substituted for pages 11–27 of the originally filed specification comprising Tables 1–8 referred to below.

BACKGROUND TO THE INVENTION

The present invention relates to a telecommunications system using an intelligent network (IN) architecture, and in particular to the control of a peripheral in such a network.

In conventional public switched networks (PSTNs) the functions the network is able to perform depend on the design of the switch which handles basic call-routing. Introducing any new functionality requires the switch to be redesigned, with the provision of new software and possibly also new hardware. For a large network this process can take one or more years. As PSTNs are required to provided a rapidly growing range of services to users, this type of delay in service provision becomes increasingly unacceptable.

Intelligent networks (IN's) have been developed to address the problem of the relative inflexibility of conventional networks. As described in the paper by T W Abernethy and A C Munday, "Intelligent networks, standards and services" BT Technol J Vol 13 No. 2 April 1995, in the intelligent network the control of the basic call routing is carried out at a service switching point (SSP) and is kept functionally separate from the control of call progression by a service control point (SCP). The service control point is also able to access functions provided by an intelligent peripheral (IP). An intelligent peripheral might be equipped, for example, to play pre-recorded announcements to a subscriber. To ensure that the interworking of networks and components of different operators and suppliers is possible, the architecture and protocols of the intelligent network are required to conform to internationally agreed standards. The need to conform to these standards might however tend to negate the very flexibility which the IN architecture was intended to provide. For example, BT has developed and deployed in the UK PSTN a voice messaging service known as CALL MINDER (TM). It would be desirable to incorporate this service on an intelligent peripheral within an IN system. The Call Minder functions however do not correspond to either of the two classes of IP functions which the relevant standards provide for.

SUMMARY OF THE INVENTION

According to a first aspect of the present invention, there is provided a method of operating an intelligent peripheral (IP) under the control of a service control point (SCP) in a telecommunications network, the method comprising:

a) passing control messages conforming to a standard protocol from the service control point to the intelligent peripheral, some of the said control messages including an extension field identifying the messages as relating to an additional function not provided for in the standard protocol;

b) executing on the intelligent peripheral, in response to at least some of the messages, predetermined functions which are provided for in the said standard protocol; and c) executing on the intelligent peripheral, in response to a message including the said extension field, a routine which implements the additional function.

The present invention provides for the first time a method of accessing any additional functions which may be provided on a given intelligent peripheral whilst maintaining conformity with standard protocols. This is achieved by effectively disguising calls to the additional functions as messages for invoking the standard functions, but with a field included in the message identifying the disguised nature of the message. The intelligent peripheral then responds by executing application code performing an appropriate one of the additional functions instead of the relevant standard function.

Preferably the said standard protocol is the Intelligent Network Application Protocol (INAP) and the said field identifying the message as relating to an additional function is the extension field of the INAP IP-to-SCP application context.

INAP—the Intelligent Network Application Protocol—is an internationally agreed standard for Intelligent Networks. The standard is set out in full in "Intelligent Network (IN); Intelligent Network Capability Set 1(CS1); Core Intelligent Network Application Protocol (INAP)", European Telecommunications Standards Institute, pr ETS 300 374-1. As described in further detail below in relation to the preferred embodiment, this protocol includes an unassigned field, the extension field, in messages passed between the IP and SCP. Conventionally this extension field would be used for passing additional data or parameters to one of the standard functions of the IP. In the preferred implementation of the present invention, this field is used instead as the identifier for messages invoking one or more additional functions available on the IP the SCP.

Preferably the said additional function includes an in-band interaction with a user connected to the IP via a SSP. This function may include a voice recognition function, in which case preferably the IP returns to the SCP data obtained by the voice recognition function According to a second aspect of the present invention, there is provided an intelligent peripheral (IP) for use in a telecommunications intelligent network under the control of a service control point (SCP), including means for reading control messages in a standard protocol received from the SCP and means for executing in response to the control messages predetermined functions provided for in the said standard protocol, characterised by means for recognising in the said messages an extension field identifying a message as relating to an additional function not provided for in the said standard protocol, and means responsive to the said means for recognising for executing the said additional function.

According to a further aspect of the present invention, there is provided a method of operating an intelligent peripheral (IP) under the control of a service control point (SCP) in a telecommunications intelligent network, including passing control messages conforming to a standard protocol from the service control point to the intelligent peripheral, and executing on the intelligent peripheral in response to at least some of the control messages predetermined functions provided for in the said standard protocol, characterised in that others of the control messages conforming to the standard protocol include a field identifying the messages as relating to an additional function not provided for in the standard protocol, and by executing on the intelligent peripheral in response to a message including the said field a routine implementing the additional function.

The invention also encompasses a service control point which implements the invention of the first aspect, and a telecommunications network incorporating such a service control point.

BRIEF DESCRIPTION OF THE DRAWINGS

Systems embodying the present invention will now be described in further detail, by way of example only, with reference to the accompanying drawings in which.

DESCRIPTION OF EXAMPLES

Figure 1:
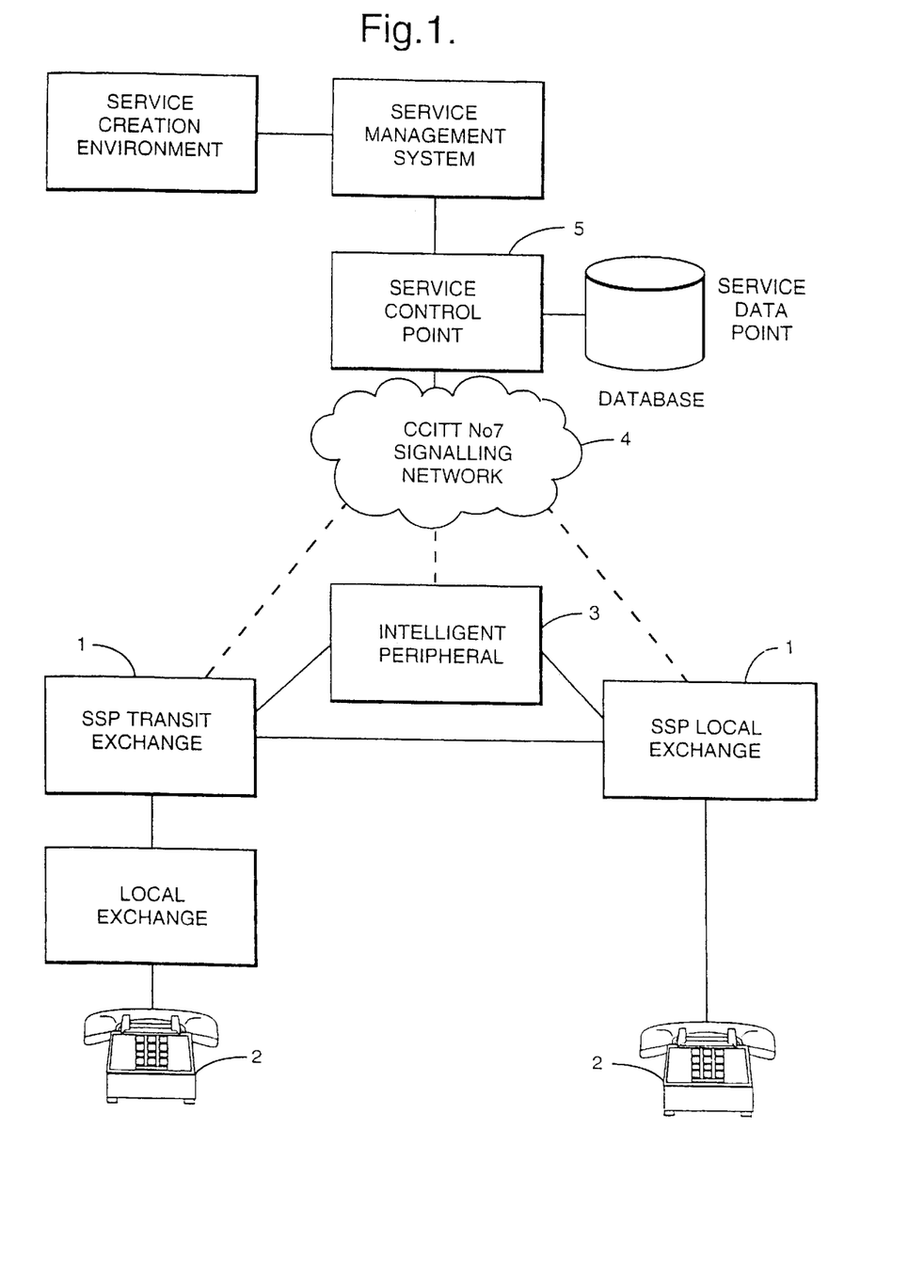
FIG. 1 is a diagram showing an intelligent network architecture.
Figure 2:
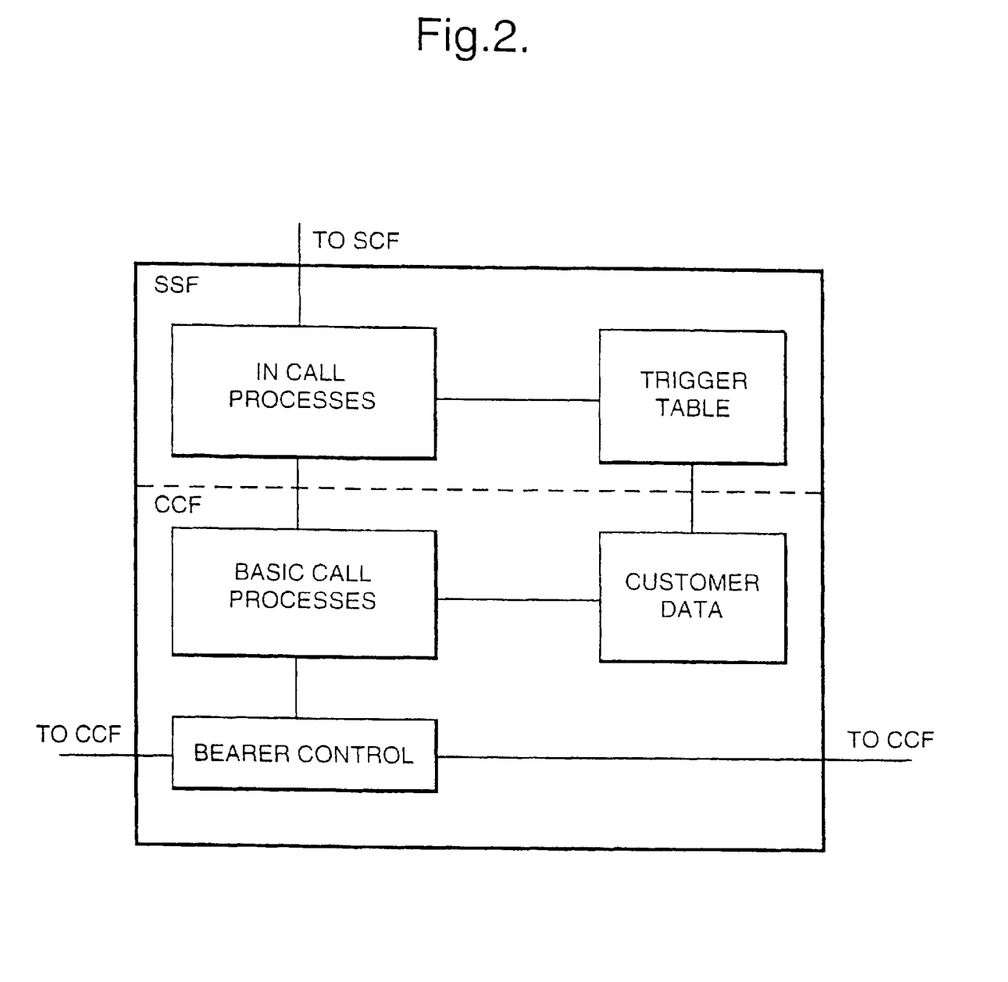
FIG. 2 is a schematic of a service switching point (SSP)

A telecommunications network employing an intelligent network (IN) architecture includes a number of service switching points (SSP's) 1 which may be located, for example, at a transit exchange or local exchange. Subscriber terminals 2 are connected, directly or indirectly, to the SSP. The SSP carries out a call control function (CCF) which comprises the basic call processes associated with the setting up of a connection between different terminals on the network. In addition, as shown in FIG. 2, the SSP includes a service switching function (SSF) which interfaces the call control function to other entities and functions on the network. In particular, the SSP is connected to an intelligent peripheral (IP) 3 which in conjunction with the SSP makes available so-called "specialised resource functions" (SRF's).

A service control point (SCP) 5 is connected to the service switching points 1 and the intelligent peripheral 3 via a signalling network 4. This network uses a digital message-based common channel signalling system known as Signalling System No. 7 (SS7) in an implementation developed by BT known as the BT national user part or NUP. The SS7 signalling system is described in further detail in Fretten KG & Davies C G: "CCITT Signalling System No. 7; Overview", British Telecommunications Eng J (April 1988).

For completeness, the diagram of FIG. 1 includes the service creation environment and service management system associated with the service control point.

In operation, enhanced core control functions run on the service control point, while the basic service switching is carried out by the service switching point. This allows the progression of a call to be suspended while further information regarding how the call is to be handled is obtained from a service data point (SDP) linked to the service control point. The decision to suspend call processing is based on the meeting of certain pre-specified criteria termed "triggers". These may be, for example, certain dialled digits or line conditions apoints during the call. As seen in FIG. 2, the SSP includes a trigger table linked to customer data.

Figure 3:
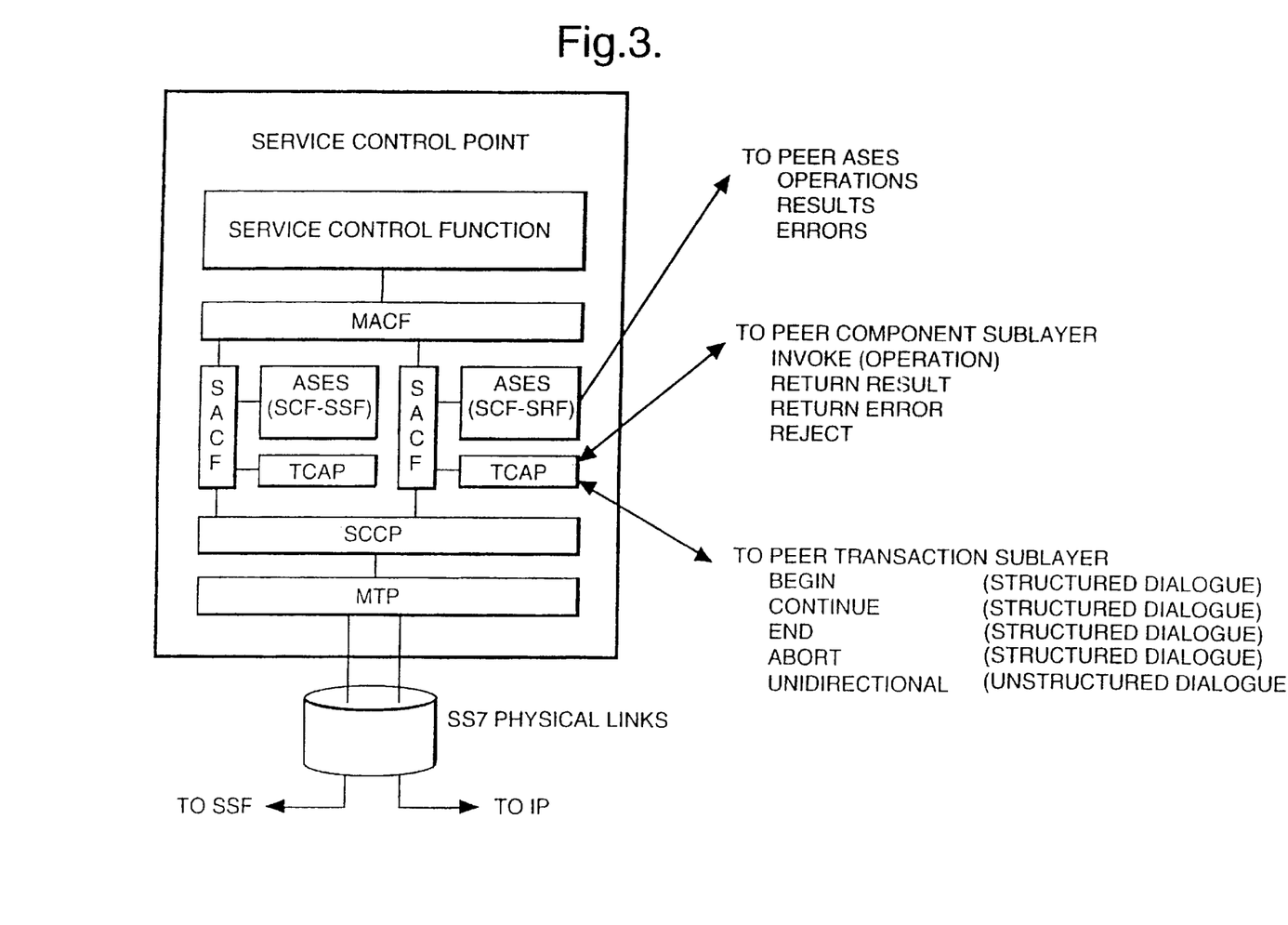
FIG. 3 is a schematic of a service control point (SCP)
Figure 4:
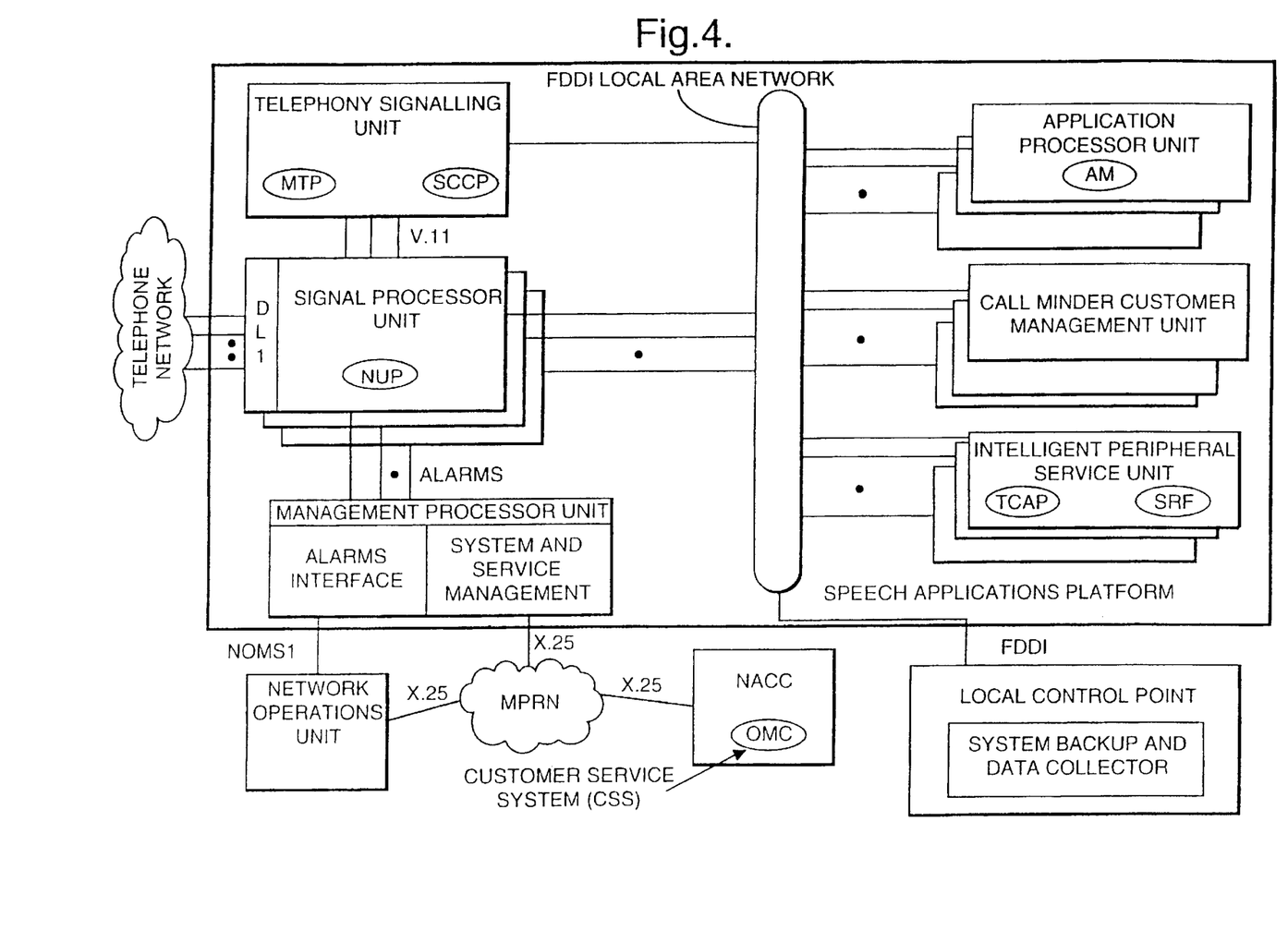
FIG. 4 is a diagram showing one example of an intelligent peripheral.

FIG. 3 shows in further detail the architecture of the service control point. The service control point is implemented on a general-purpose computing platform that hosts advanced service control software or service logic.

The structure and operation of the network, other than in the aspects described further below, are generally conventional in nature and are not further described here. For further information, reference is made to the above-cited paper by T W Abernethy and A C Munday and to the European Telecommunications Standards Institute final draft prETS300374-1 published July 1994.

The operation of a system embodying the present invention will now be described with reference to FIGS. 4 to 11.

As discussed in the introduction above, the invention is particularly concerned with the control of the intelligent peripheral IP by the service control point SCP. Conventionally, using the INAP protocol, the SCP has been able to access just two classes of operation in the IP. These are known respectively as (PromptAndCollectUserInformation (P&C)) and (PlayAnnouncement (PA)). These operations are defined in ASN.1 notation in Tables 4.1 and 4.2, and their arguments are defined in Tables 5.1 and 5.2. This notation is described in CCITT Recommendation X.208 (1988): "Specification of Abstract Syntax Notation 1 (ASN.1)". As will be understood by those skilled in the art, this notation serves not merely to define the relevant features, but also, following standard encoding rules, provides a basis for the generation of code to implement the features by decoding and encoding messages passed between the SCP and IP. The code may be generated, for example, using commercially available ASN.1 compliers.

The PA operation is used for in-band interaction with an analogue user or for interaction with an ISDN user. For example, in response to certain triggers during a call, such as a failure by a calling party to dial a recognised number, the SCP may establish a connection between the IP and the calling party, and instruct the IP to play a pre-recorded message: "the number has not been recognised". The PA operation does not return any data to the SCP. The parameters of the PA operation are listed in Table 6 below.

The P&C operation is used to interact with a call party to collect information. For example, in a recorded timetable service with a numbered menu of different timetables, the user may be asked to dial a digit indicating which timetable is to be played. The IP recognises the value dialled and returns this value to the SCP which can then instruct the IP to play the appropriate recording to the call party. The parameters of the P&C operation are listed in Table 7 below.

Figure 5:
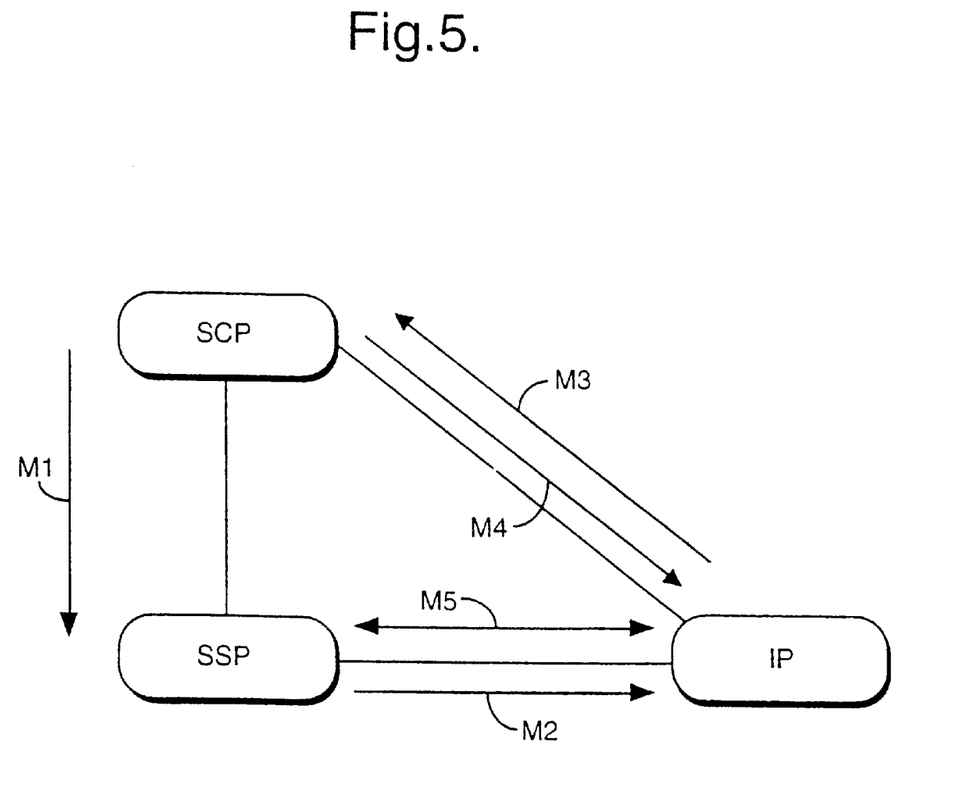
FIG. 5 is a diagram showing schematically the interaction between the SCP, SSP and IP.

FIG. 5 shows the sequence of operations and messages passing between the SCP, IP and SSP during an operation such as PA. To access an IP function, the SCP first sends an EstablishTemporaryConnection message (m1) to the SSP. This message includes the address of the IP, a correlation ID, and an identifier for the issuing SCP, the SCF ID. In response to this message the service switching point SSP initiates a call (m2) to the identified intelligent peripheral IP. The IP responds to the controlling SCP with an AssistRequestInstructions message (m3). The response from the SCP is a call (m4) to the relevant function provided by the IP. In the example of the intelligent peripheral shown in FIG. 6 the call (m4) to one of the special resource functions is handled by the Application Manager 61 under the control of the SRF.

Figure 6:
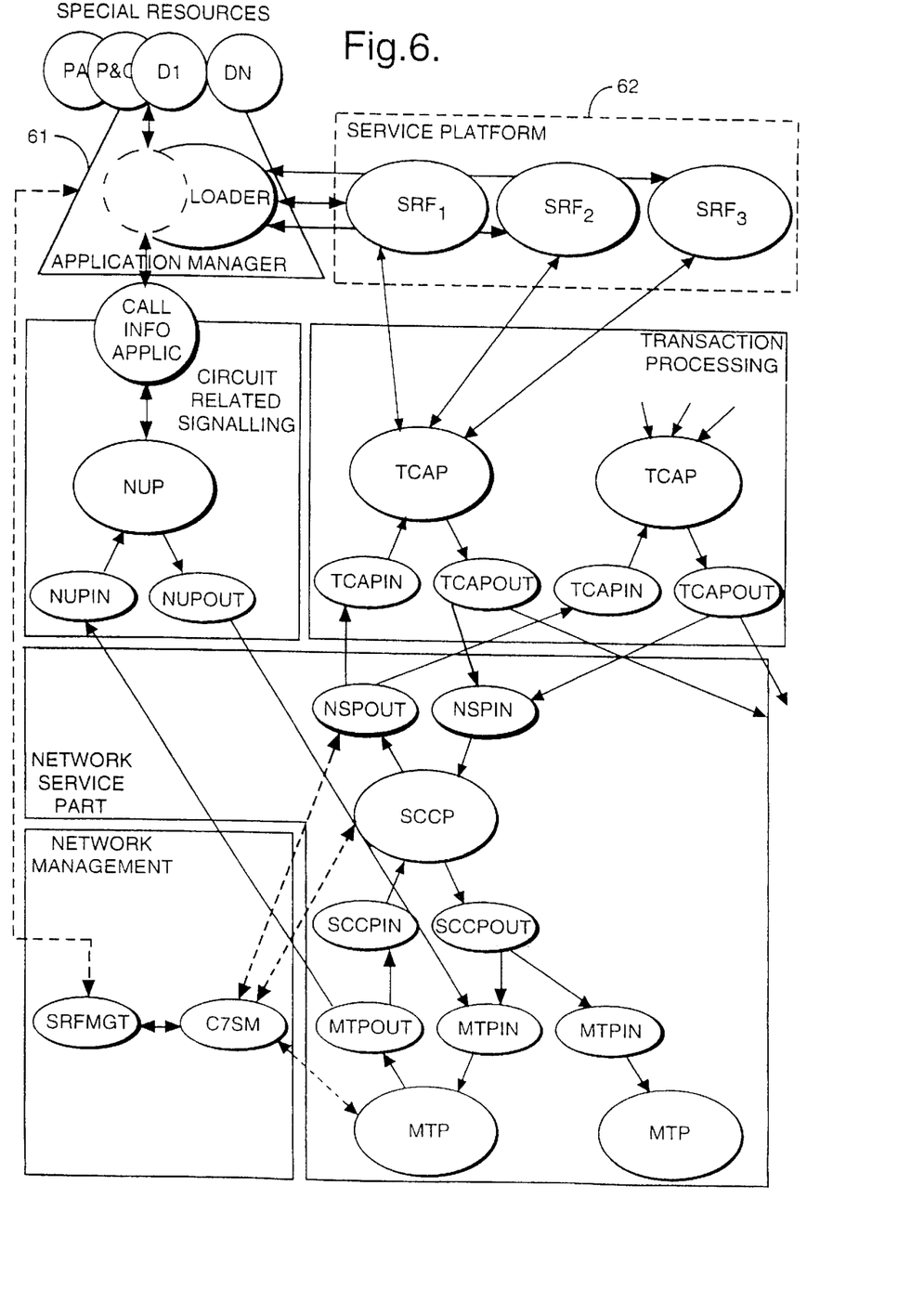
FIG. 6 is a diagram showing an overview of the functional architecture of an IP embodying the present invention.

The SRF is a module of the IP which interprets the call from the SCP and loads and using the Application Manager 61 runs on the computing platform 62 of the IP application code for implementing the relevant function. Message (m5) is the in-band interaction between the IP and the user via the SSP corresponding to the function called by message (m4).

In this example of an IP, additional special resources termed by the inventors "custom dialogues" D1 ... Dn are available. These functions are invoked by service requests from the SCP which retain the format of the conventional calls to the PA or P&C resources, but which include in addition the extension field provided for those operations in the INAP protocol. Thus, the sequence of messages m1 to m6 outlined above remains essentially unchanged, but message m4 includes the extension field. In systems embodying the present invention, the IP and SCP are programmed to treat this field as a flag identifying a message as relating to a custom dialogue rather than a standard resource. The IP then runs the dialogue indicated by the sub-field "dialogue identifier" contained within the extension field, instead of the standard dialogues the operation carrying this extension suggest (ie PA or P&C). The manner in which this field is used and interpreted is formally defined in Table 1 below using the ASN.1 formalism.

Figure 11:
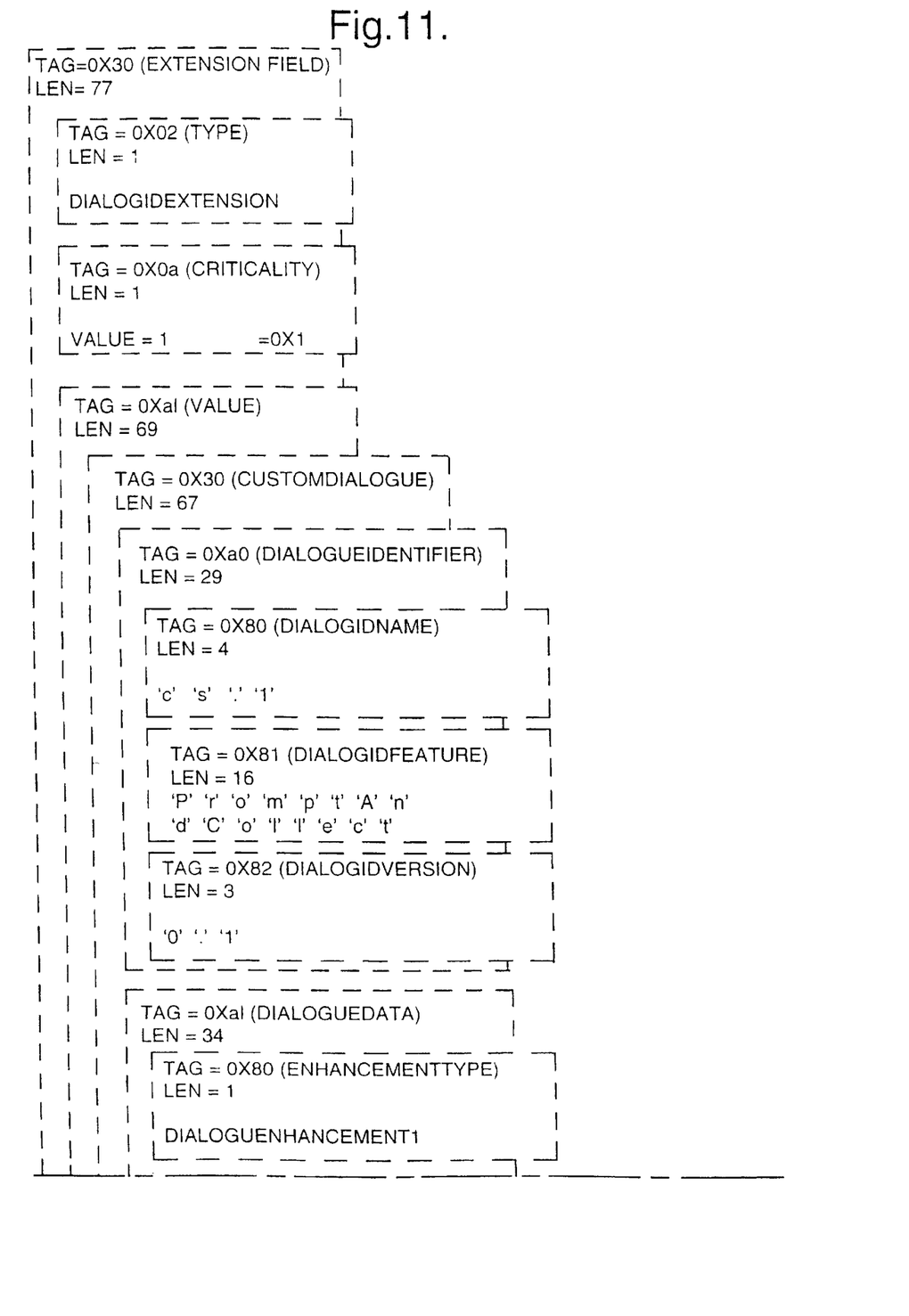
FIG. 11 is a schematic showing the format of an extension field.

Any custom dialogue may include enhancements using data specific to the custom dialogue. By way of example, a first enhancement is described which provides support for voice recognition. As described above, of the two standard operations PA and P&C, only P&C has a result in which information gathered in an interactive dialogue can be returned. Since it is essential for the voice recognition operation to be able to return the results of the recognition, this enhanced dialogue, custom dialogue enhancement 1, is only defined for the P&C operation. This enhancement operates in addition to the main body of the P&C operation and therefore allows both digits and yes and no to be recognised at the same time. This enhancement is set out in ASN.1 notation in Table 2 and Table 8 lists the meaning of the parameters of this operation. FIG. 11 shows the format of the signals making up the extension field passed from the SCP to the IP in this example. As shown in the Figure, the extension field, and each of the sub-fields, are identified by a tag having a predetermined value and each field or sub-field is of a predetermined length. The overall length of the extension field is 79 bytes, comprising a 2-byte tag and contents of length 77 bytes. The extension field has Type, Criticality and Value sub-fields, and the Value sub-field in turn has its own sub-fields, as shown in the Figure and defined in the ASN.1 listing.

In a second example of a system embodying the present invention three custom dialogues are provided to enable the IP to function as a messaging platform. The 3 dialogues are:

1. Name=messaging, feature=record message, version= 0.1
2. Name=messaging, feature=play back message, version=0.1.
3. Name=messaging, feature=delete message, version= 0.1.

Each of the custom dialogues includes enhancements, contained in the dialogue data, which allows them to transport data specific to that dialogue. Table 3.1 below sets out the record message enhancement. This allows the SCP to specify the format of the message that is to be recorded by the IP. Two formats are currently possible, voice or fax.

Table 3.2 sets out the play back message enhancement. This enhancement specifies a message and the format (speech or fax) in which it is to be played back by the IP. If playback of messages were to be achieved using the conventional play announcement operation, then this would not allow fax messages to be retrieved. The playback message enhancement is therefore used to provide for the message being returned as a fax or in other formats in addition to the speech format of the standard PA operation.

Table 3.3 sets out the delete message enhancement. This enhancement allows the user to specify which of a number of stored messages is to be deleted from the intelligent peripheral storage.

One example of the hardware for a platform implementing the present invention will now be described in further detail, and the mapping of the different processes discussed above to the hardware outlined. Referring back to FIG. 6, it can be seen that the highest level functions are the special resource function (SRF) and the associated application manager. The SRFs are linked to a transaction processing or TCAP—Transaction Capabilities Application Part layer. This in turn sits upon a SCCP, (Signalling Connection Control Part,) layer and an MTP (Message Transfer Part) layer. The circuit-related signalling is handled by a NUP layer. The peripheral also includes SRF management functions and C7 signalling management.

In the platform built by the present applicants and known as the "Interactive Speech Application Platform" (ISAP) there are four main sections, each implemented as a shelf containing a number of processor cards.

Figure 7:
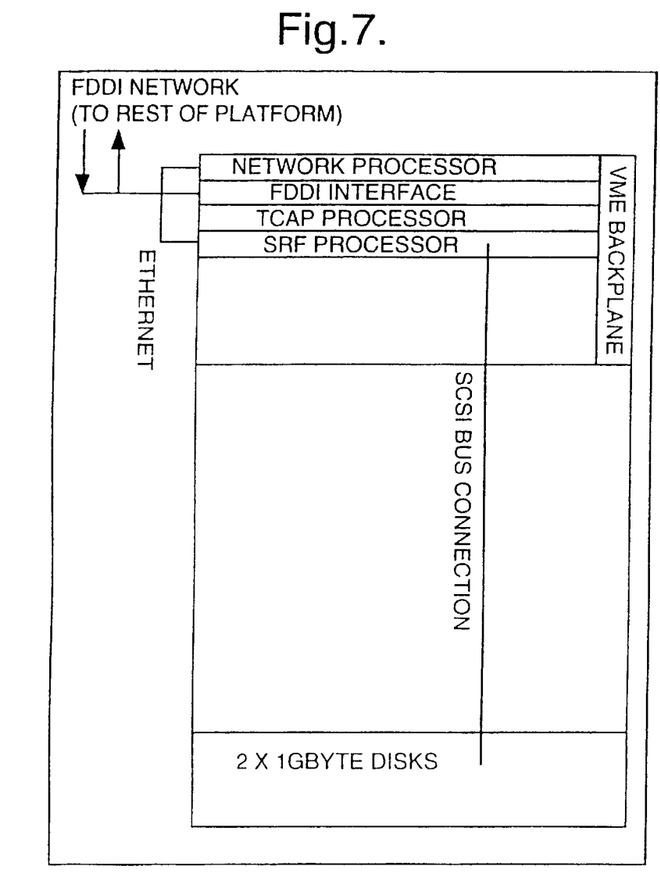
FIG. 7 is a schematic of an IP service platform.

An IP service platform (FIG. 7) implements the TCAP and SRF functions, and stores data for use by the IP. As shown in FIG. 7, in this example the IP service platform comprises network processor, FDDI interface, TCAP processor and SRF processor cards mounted on an VME backplane and linked by a SCSI bus connection to 1 Gbyte hard discs. The network processor uses a Motorola 68040/4CPU, the TCAP processor uses a Motorola 68040/16CPU and the SRF processor uses a Digital SPARC 5VE processor with 16 Mbytes of memory. The IP service platform shelf is linked by the FDDI local area network to SP, MITP and management shelves.

Figure 10:
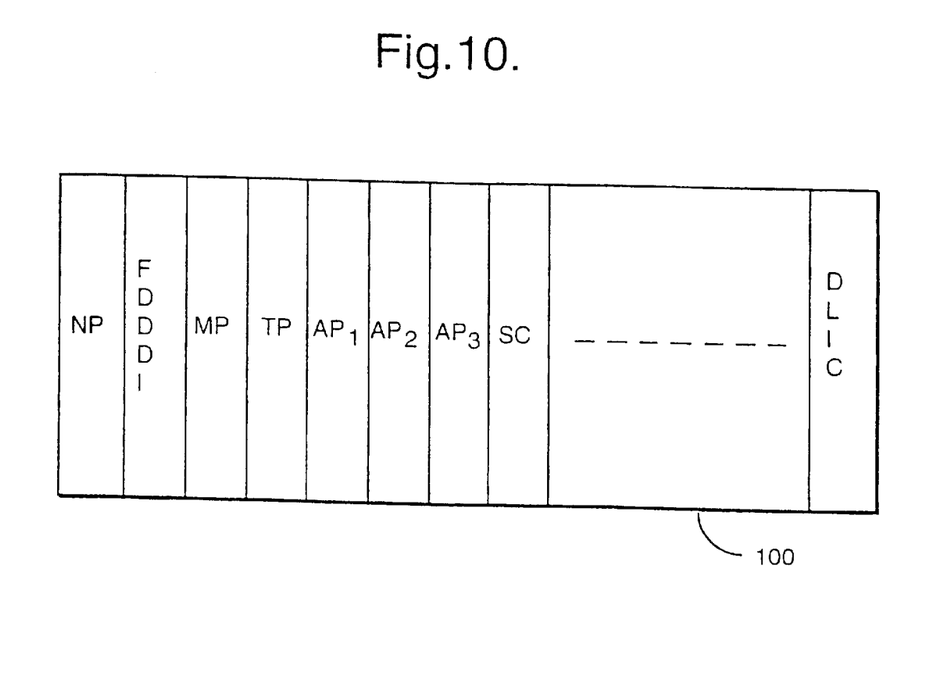
FIG. 10 is a schematic of a speech processor shelf.

The SP (speech processor) shelf (100; FIG. 10) includes a telephony processor configured to use the C7 protocol discussed above. The telephony processor (TP) supports NUP and also the MTPin MTPout processes necessary to communicate with the MTP (message transfer part) processes. The other major components of the SP shelf are application processors which support the application manager and the routines executing the SRF functions or "dialogues". The application manager uses a broadcast mechanism to select SRF instances. A digital line interface card (DLIC) terminates PCM signals received by the shelf. A number of speech cards SC each containing a DSP such as a Motorola 56000 series processor, implement speech recognition and related functions. Network processor (NP), resource management processor (MP), and telephony processor (TP) cards each use Motorola 68040/16 CPUs. The three application processor cards $AP_{1-3}$ each contain a SPARC 5 VE processor.

The MTP shelf supports the MTP and SCCP functions. The interface between MTP and SCCP is provided by MTPin and MTPout process pairs. There are two MTP processors per link set, each using one of two separately powered VME backplanes, with typically two links in each link set. The MTP processing for non-circuit related traffic is not mixed with circuit related traffic. There is therefore provided one set of MTP processor pairs for non-circuit related traffic and another for circuit-related traffic.

Figure 8:
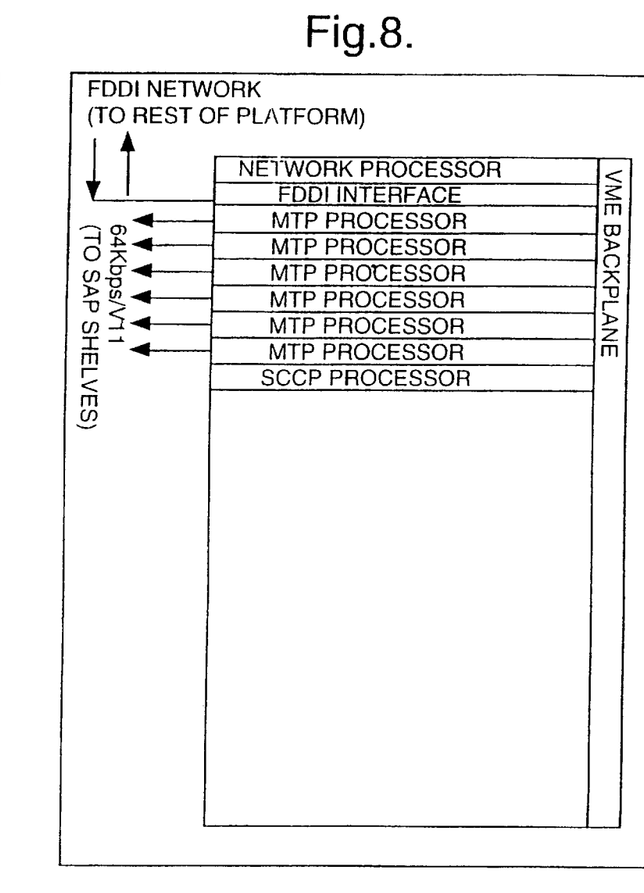
FIG. 8 is a schematic of an MTP shelf for use with the service platform of FIG. 7.

In the example illustrated in FIG. 8, the MTP unit consists of an VME backplane with a network processor card carrying a Motorola 6804014 processor and an FDDI interface card. There is then one MTP processor—a Motorola 68040/16 CPU with 68302 "Eagle—03" module—for each signalling link set.

The MTP unit also includes an SCCP processor card including a Motorola 608040/16 SCCP processor. This processor implements SCCPin and SCCPout, NSPin and NSPout and SCCP manager functions. Two SCCP processors are provided for each installation for resilience.

A fourth shelf of the SAP contains a management processor (MP) which supports management functions for the SRF's and for C7 signalling and controls external interfaces to the ISAP.

Figure 9:
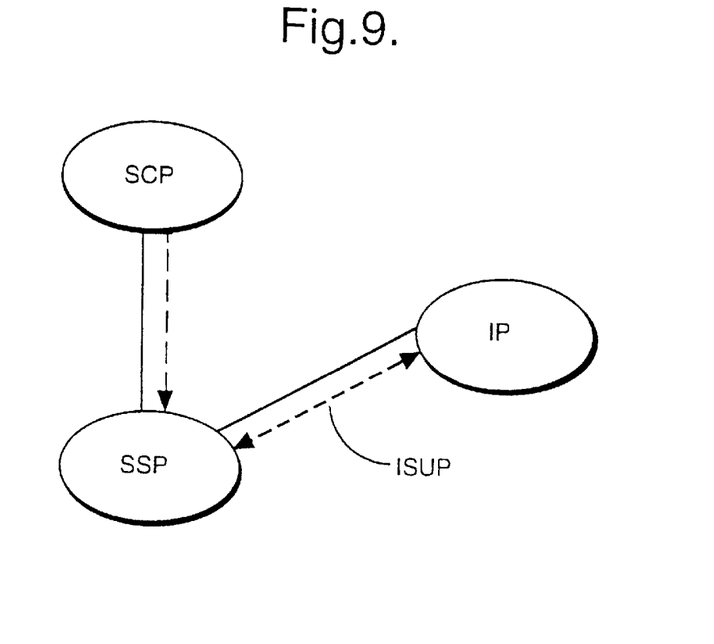
FIG. 9 is a schematic of an alternative implementation.

Although in the examples so far described, the interface between the IP and the SCP defined at the INAP/TCAP protocol layers is supported by SCCP/MTP network protocols, the invention may also be implemented using other network level protocols to support the INAP interactions. For example, FIG. 9 is a schematic of a system in which the messages from the SCP to the IP are directed via the SSP using the facility field of the ISUP (integrated services user part) protocol. This is the protocol relating to the implementation of intelligent networks using ISDN technology. As a further alternative, the invention might be implemented using TCP/IP protocols over a link between the SCP and the IP using, for example, ethernet FDDI fibre LAN technology.

I claim:

1. A method of operating an intelligent peripheral (IP) under the control of a service control point (SCP) in a telecommunications network, the method comprising:
    a) passing control messages conforming to a standard protocol from the service control point to the intelligent peripheral, some of the said control messages including an extension field identifying the messages as relating to an additional function not provided for in the standard protocol;
    b) executing on the intelligent peripheral, in response to at least some of the messages, predetermined functions which are provided for in the said standard protocol; and
    c) executing on the intelligent peripheral, in response to a message including the said extension field, a routine which implements the additional function.

2. A method according to claim 1, in which the standard protocol is the Intelligent Network Application Protocol (INAP) and the said field identifying the message as relating to an additional function is the extension field of the INAP intelligent peripheral-to-SCP application context.

3. A method according to claim 2, in which each of the said messages including the said extension field further comprises an identifier field for identifying the message as relating to one of a plurality of different additional functions.

4. A method according to claim 2, in which the said message including the extension field further comprises an additional function data field, data contained in the said additional function data field being passed to the additional function executed on the intelligent peripheral.

5. A method according to claim 1, in which any data collected by an additional function is returned in the form of an argument of one of the predetermined functions provided for in the said standard protocol.

6. A method according to claim 5 when directly or indirectly dependent on claim 2, in which the collected data is returned as the argument of a PromptAndCollectUserInformation function.

7. A method according to claim 1, in which the step of executing the additional function includes carrying out an in-band interaction with a user connected to the intelligent peripheral via an SSP.

8. A method according to claim 7, in which the additional function includes a voice recognition function.

9. A method according to claim 8, further comprising returning from the intelligent peripheral to the SCP data obtained by the voice recognition function.

10. A service control point for use in a telecommunications network which includes an intelligent peripheral (IP) which is arranged to function under the control of the service control point, the service control point comprising:
    a) a control processor which is arranged to execute a service control function;
    b) a signalling interface which is connected to the control processor and which is arranged to generate messages in a standard protocol for transmission to an intelligent peripheral, the said signalling interface including means for writing in some only of the said messages an extension field which identifies a message as relating to an additional function which is not a function provided for in the said standard protocol.

11. A telecommunications network including an intelligent peripheral for use in a telecommunications network under the control of a sevice control point, the intelligent peripheral comprising:
    a) means for reading messages in a standard protocol received from the service control point;
    b) means for executing in response to the control messages predetermined functions provided for in the said standard protocol;
    c) means for recognizing in the said messages an extension field identifying a message as relating to an additional function not provided for in the said standard protocol; and
    d) means responsive to the said means for recognizing for executing the said additional function; and
    a service control point for use in a telecommunications network which includes an intelligent peripheral which is arranged to function under the control of the service control point, the service control point comprising:
    a) a control processor which is arranged to execute a service control function;
    b) a signalling interface which is connected to the control processor and which is arranged to generate messages in a standard protocol for transmission to an intelligent peripheral, the said signalling interface including means for writing in some only of the said messages an extension field which identifies a message as relating to an additional function which is not a function provided for in the said standard protocol.

12. A telecommunications network including an intelligent peripheral according to claim 11 and further including a service control point for use in a telecommunications network which includes an intelligent peripheral (IP) which is arranged to function under the control of the service control point, the service control point comprising:
    a) a control processor which is arranged to execute a service control function;
    b) a signalling interface which is connected to the control processor and which is arranged to generate messages in a standard protocol for transmission to an intelligent peripheral, the said signalling interface including means for writing in some only of the said messages an extension field which identifies a message as relating to an additional function which is not a function provided for in the said standard protocol.

13. A method of operating an intelligent peripheral (IP) under the control of a service control point (SCP) in a telecommunications intelligent network, including passing control messages conforming to a standard protocol from the service control point to the intelligent peripheral, and executing on the intelligent peripheral in response to at least some of the control messages predetermined functions provided for in the said standard protocol, characterised in that others of the control messages conforming to the standard protocol include a field identifying the messages as relating to an additional function not provided for in the standard protocol, and by executing on the intelligent peripheral in response to a message including the said field a routine implementing the additional function.

* * * * *